(12) United States Patent
Guo et al.

(10) Patent No.: US 10,104,300 B2
(45) Date of Patent: Oct. 16, 2018

(54) SYSTEM AND METHOD FOR SUPPORTING PHOTOGRAPHY WITH DIFFERENT EFFECTS

(71) Applicant: SZ DJI TECHNOLOGY CO., LTD., Shenzhen (CN)

(72) Inventors: Zhuo Guo, Hong Kong (CN); Guanhua Su, Shenzhen (CN); Ye Tao, Shenzhen (CN); Zisheng Cao, Shenzhen (CN); Linchao Bao, Shenzhen (CN); Mingyu Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/348,549

(22) Filed: Nov. 10, 2016

(65) Prior Publication Data
US 2017/0078587 A1     Mar. 16, 2017

Related U.S. Application Data

(63) Continuation of application No. PCT/CN2015/089692, filed on Sep. 16, 2015.

(51) Int. Cl.
*H04N 5/232* (2006.01)
*G06T 7/73* (2017.01)
(Continued)

(52) U.S. Cl.
CPC ......... *H04N 5/23296* (2013.01); *G06K 9/32* (2013.01); *G06T 7/246* (2017.01); *G06T 7/73* (2017.01);
(Continued)

(58) Field of Classification Search
CPC ....... H04N 5/23219–5/23238; H04N 5/23293; H04N 5/23296; G06K 9/32–9/3241;
(Continued)

(56) References Cited

U.S. PATENT DOCUMENTS 6,191,842 B1   2/2001   Navarro
8,085,308 B2  12/2011   Icho et al.
(Continued)

FOREIGN PATENT DOCUMENTS

CN     202327560 U    7/2012
CN     202327580      7/2012
(Continued)

OTHER PUBLICATIONS

International Search Report dated Jun. 14, 2016, issued by the State Intellectual Property Office of the P.R China in Counterpart International Application No. PCT/CN2015/089692; 4 pages.
(Continued)

*Primary Examiner* — Roberto Velez
*Assistant Examiner* — Quan Pham
(74) *Attorney, Agent, or Firm* — Finnegan, Henderson, Farabow, Garrett & Dunner, LLP

(57) ABSTRACT

System and method can support photography. A controller can configure a carrier to move an imaging device along a moving path. Furthermore, the controller can apply a time-dependent configuration on the imaging device, and use the imaging device for capturing a set of image frames along the moving path based on the one or more time-dependent parameters.

36 Claims, 10 Drawing Sheets

(51) Int. Cl.
*G08B 13/196* (2006.01)
*G06T 7/246* (2017.01)
*G06T 7/70* (2017.01)
*G06K 9/32* (2006.01)

(52) U.S. Cl.
CPC ... *G08B 13/1963* (2013.01); *G08B 13/19608* (2013.01); *H04N 5/232* (2013.01); *H04N 5/23293* (2013.01); *G06T 7/70* (2017.01); *G06T 2207/10016* (2013.01); *G08B 13/19689* (2013.01)

(58) Field of Classification Search
CPC ..... G06K 2009/3291; G06T 7/70–7/77; G08B 13/19608; G08B 13/1963; G08B 13/19689
See application file for complete search history.

(56) References Cited

U.S. PATENT DOCUMENTS

| | | | |
|---|---|---|---|
| 9,030,149 B1 | 5/2015 | Chen et al. | |
| 9,527,588 B1* | 12/2016 | Rollefstad | B64C 39/024 |
| 2008/0002031 A1 | 1/2008 | Cana et al. | |
| 2010/0004802 A1 | 1/2010 | Bodin et al. | |
| 2010/0208941 A1 | 8/2010 | Broaddus et al. | |
| 2011/0304737 A1 | 12/2011 | Evans et al. | |
| 2012/0105647 A1* | 5/2012 | Yoshizumi | G03B 17/38 348/169 |
| 2016/0171330 A1* | 6/2016 | Mentese | G06K 9/3233 348/170 |
| 2016/0269648 A1 | 9/2016 | Hayashi et al. | |
| 2016/0327950 A1* | 11/2016 | Bachrach | G05D 1/0016 |

FOREIGN PATENT DOCUMENTS

| | | |
|---|---|---|
| CN | 103394199 | 11/2013 |
| CN | 103394199 A | 11/2013 |
| CN | 103426282 | 12/2013 |
| CN | 103426282 A | 12/2013 |
| CN | 104828256 | 8/2015 |
| CN | 104828256 A | 8/2015 |
| EP | 2 899 691 A1 | 7/2015 |
| JP | 08-178180 A | 7/1996 |
| JP | 2004-184170 | 7/2004 |
| JP | 2005-117384 | 4/2005 |
| JP | 2007-225809 | 9/2007 |
| JP | WO2007/097431 | 7/2009 |
| JP | 2011-155362 | 8/2011 |
| JP | 2014-17611 | 1/2014 |
| JP | WO2015/098418 | 7/2015 |
| WO | WO 20071097431 | 8/2007 |
| WO | WO 20151098418 | 7/2015 |

OTHER PUBLICATIONS

Written Opinion dated Jun. 14, 2016, issued by the State Intellectual Property Office of the P.R. China in counterpart International Application No. PCT/CN2015/089692; 4 pages.

Notification of Reasons for Refusal from the Japanese Patent Office, in counterpart Japanese Application No. 2016-554737 dated Sep. 8, 2017.

Notification of Reasons for Refusal from the Japanese Patent Office, in counterpart Japanese Application No. 2016-554737 dated Nov. 9, 2017.

Extended European Search Report dated Jun. 29, 2018; issued by the European Patent Office in counterpart European Patent Application No. 15903835.5-1208 / 3350499 PCT/CN2015089692.

Chinese Office Action issued by the Chinese Patent Office in counterpart Chinese Patent Application No. 201580049246.0 dated Jul. 2, 2018.

\* cited by examiner

SYSTEM AND METHOD FOR SUPPORTING PHOTOGRAPHY WITH DIFFERENT EFFECTS

CROSS-REFERENCE TO RELATED APPLICATIONS

This application is a continuation application of International Application No. PCT/CN2015/089692 filed on Sep. 16, 2015, the content of which is hereby incorporated by reference in its entirety.

BACKGROUND OF THE INVENTION

The disclosed embodiments relate generally to supporting photography and more particularly, but not exclusively, to supporting photography with different effects.

A large variety of photographic effect technologies have been developed in the past century. However, the created effects tend to be simple and rigid, due to the fact that the cameras have to either be fixed at a place or be associated with limited degrees of freedom. On the other hand, the computer generated imagery (CGI) technologies allows for more flexible scene movement, but at the expense of video resolution and image quality. Hence, there is a need for supporting high quality, low cost, and free style photography.

This is the general area that embodiments of the invention are intended to address.

BRIEF SUMMARY OF THE INVENTION

Described herein are systems and methods that can support photography. A controller can configure a carrier to move an imaging device along a moving path. Furthermore, the controller can apply a time-dependent configuration on the imaging device, and use the imaging device for capturing a set of image frames along the moving path based on the one or more time-dependent parameters.

Also described herein are systems and methods that can support photography. A controller can configure a carrier to move an imaging device along a moving path, wherein the carrier operates to stabilize the imaging device. Furthermore, the controller can use the imaging device to capture a set of image frames along the moving path, wherein the set of image frames are adapted to be used in generating one or more panoramic images.

Also described herein are systems and methods that can support photography. A controller can acquire a target in an image view based on one or more images that are captured by an imaging device associated with a carrier. Furthermore, the controller can obtain characterization information of the target as indicated in said one or more images, and direct the carrier to move the imaging device to track the target based on the obtained characterization information of the target.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses a hand-held device as example for a portable device. It will be apparent to those skilled in the art that other types of portable devices can be used without limitation.

Figure 1:
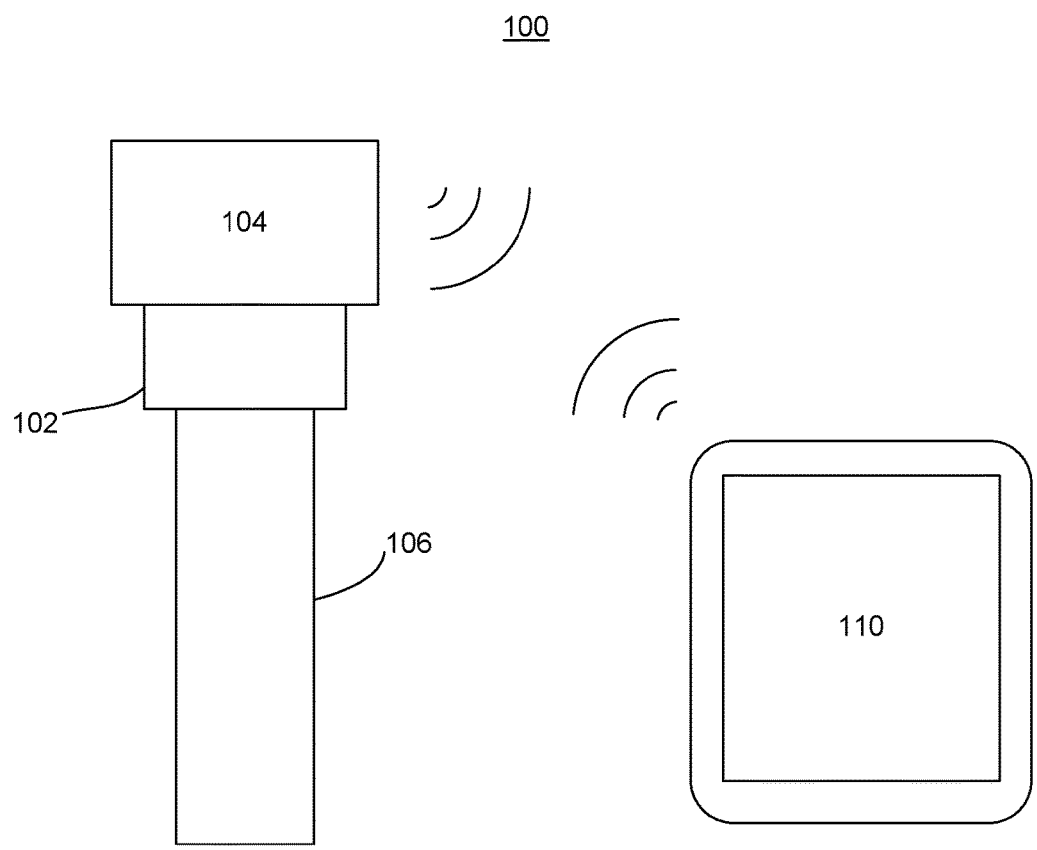
FIG. 1 illustrates a portable device environment, in accordance with various embodiments of the present invention.

FIG. 1 illustrates a portable device environment, in accordance with various embodiments of the present invention. As shown in FIG. 1, a portable device 106 in a portable device environment 100 can include a carrier 102 and a payload 104.

Although the portable device 106 can be depicted with a handler, this depiction is not intended to be limiting, and any suitable type of portable device can be used. One of skill in the art would appreciate that any of the embodiments described herein in the context of portable systems can be applied to any suitable portable device. In some instances, the payload 104 may be provided on the portable device 106 without requiring the carrier 102.

Furthermore, the portable device 106 may be associated with one or more movement mechanisms, instead of (or in addition to) be capable of being carried (e.g. hand-held) by a person. The movement mechanisms can include one or more of rotors, propellers, blades, engines, motors, wheels, axles, magnets, nozzles, and animals.

In accordance with various embodiments of the present invention, the portable device 106 may include a sensing system and a communication system.

The sensing system can include one or more sensors that may sense the spatial disposition, velocity, and/or acceleration of the portable device 106 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system can be used to control the spatial disposition, velocity, and/or orientation of the portable device 106 (e.g., using a suitable processing unit and/or control module). Alternatively, the sensing system can be used to provide data regarding the environment surrounding the portable device 106, such as weather conditions, proximity to potential obstacles, location of geographical features, location of manmade structures, and the like.

The communication system enables communication with a terminal 110 having a communication system via (wired or wireless) signals 116. The communication systems on the portable device 106 and the terminal 110 may include any number of transmitters, receivers, and/or transceivers suitable for wireless communication. The communication may be one-way communication, such that data can be transmitted in only one direction. For example, one-way communication may involve only the portable device 106 transmitting data to the terminal 110, or vice-versa. The data may be transmitted from one or more transmitters of the communication system on the portable device 106 to one or more receivers of the communication system on the terminal 110, or vice-versa. Alternatively, the communication may be two-way communication, such that data can be transmitted in both directions between the portable device 106 and the terminal 110. The two-way communication can involve transmitting data from one or more transmitters of the communication system on the portable device 106 to one or more receivers of the communication system on the terminal 110, and vice-versa.

In some embodiments, the terminal 110 can provide control data to one or more of the portable device 106, carrier 102, and payload 104 and receive information from one or more of the portable device 106, carrier 102, and payload 104 (e.g., position and/or motion information of the portable device 106, carrier 102 or payload 104; data sensed by the payload such as image data captured by a payload camera; and data generated from image data captured by the payload camera). In some instances, control data from the terminal may include instructions for relative positions, movements, actuations, or controls of the portable device, carrier, and/or payload. For example, the control data may result in a modification of the location and/or orientation of the portable device (e.g., via control of the movement mechanisms), or a movement of the payload with respect to the portable device (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the portable device, carrier and/or payload may include information from one or more sensors (e.g., of the sensing system or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the portable device, carrier, and/or payload. Such information from a payload may include data captured by the payload or a sensed state of the payload. The control data transmitted by the terminal 110 can be configured to control a state of one or more of the portable device 106, carrier 102, or payload 104. Alternatively or in combination, the carrier 102 and payload 104 can also each include a communication module configured to communicate with terminal 110, such that the terminal can communicate with and control each of the portable device 106, carrier 102, and payload 104 independently.

In some embodiments, the portable device 106 can be configured to communicate with another remote device in addition to the terminal 110, or instead of the terminal 110. The terminal 110 may also be configured to communicate with another remote device as well as the portable device 106. For example, the portable device 106 and/or terminal 110 may communicate with another portable device, or a carrier or payload of another portable device. When desired, the remote device may be a second terminal or other computing device (e.g., computer, laptop, tablet, smartphone, or other mobile device). The remote device can be configured to transmit data to the portable device 106 receive data from the portable device 106, transmit data to the terminal 110, and/or receive data from the terminal 110. Optionally, the remote device can be connected to the Internet or other telecommunications network, such that data received from the portable device 106 and/or terminal 110 can be uploaded to a website or server.

Figure 2:
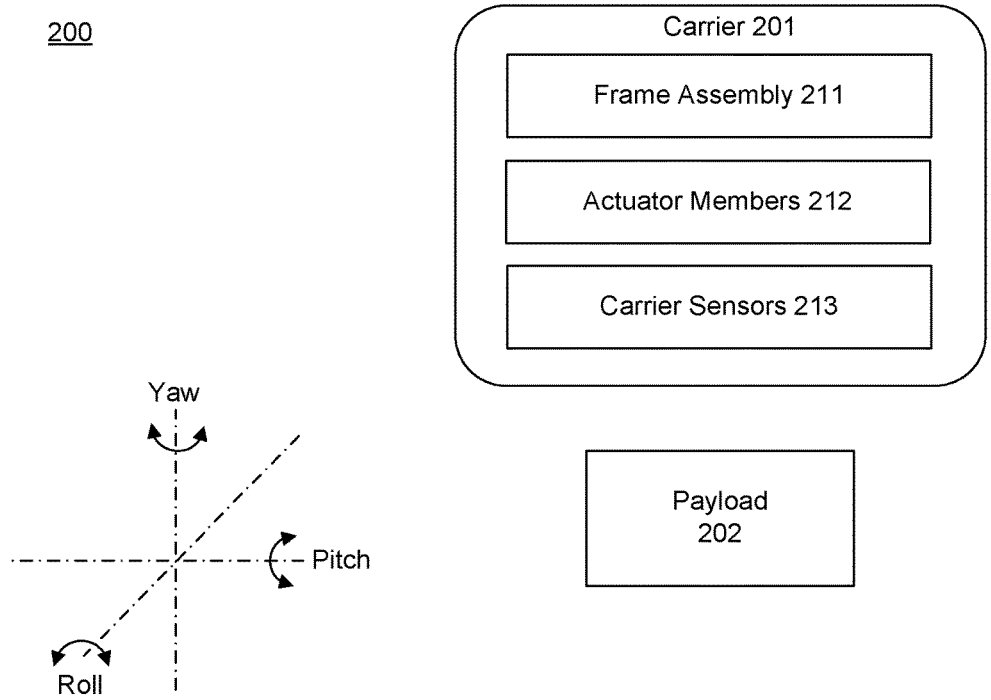
FIG. 2 illustrates an exemplary carrier in a portable device environment, in accordance with embodiments of the present invention.

FIG. 2 illustrates an exemplary carrier in a portable device environment, in accordance with embodiments of the present invention. The carrier 201 can be used to couple a payload 202 such as an image capturing device to a portable device 200.

The carrier 201 can be configured to permit the payload 202 to rotate about one or more axes, such as three axes: X or pitch axis, Z or roll axis, and Y or yaw axis, relative to the portable device. For instance, the carrier 201 may be configured to permit the payload 202 to rotate only around one, two, or three of the axes. The axes may or may not be orthogonal to each other. The range of rotation around any of the axes may or may not be limited and may vary for each of the axes. The axes of rotation may or may not intersect with one another. For example, the orthogonal axes may intersect with one another. They may or may not intersect at a payload 202. Alternatively, they may not intersect.

The carrier 201 can include a frame assembly 211 comprising one or more frame members. For example, a frame member can be configured to be coupled with and support the payload 202 (e.g., image capturing device).

In some embodiments, the carrier 201 can comprise one or more carrier sensors 213 useful for determining a state of the carrier 201 or the payload 202 carried by the carrier 201. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 202. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors 213 may be coupled to any suitable portion or portions of the carrier (e.g., frame members and/or actuator members) and may or may not be movable relative to the portable device. Additionally or alternatively, at least some of the carrier sensors may be coupled directly to the payload 202 carried by the carrier 201.

The carrier sensors 213 may be coupled with some or all of the actuator members of the carrier. For example, three carrier sensors can be respectively coupled to the actuator members 212 for a three-axis carrier and configured to measure the driving of the respective actuator members 212 for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors 213 may also be coupled to some or all of the frame members of the carrier. The sensors may be able to convey information about the position and/or orientation of one or more frame members of the carrier and/or the image capturing device. The sensor data may be used to determine position and/or orientation of the image capturing device relative to the portable device and/or a reference frame.

The carrier sensors 213 can provide position and/or orientation data that may be transmitted to one or more controllers (not shown) on the carrier or portable device. The sensor data can be used in a feedback-based control scheme. The control scheme can be used to control the driving of one or more actuator members such as one or more motors. One or more controllers, which may be situated on a carrier or on a portable device carrying the carrier, can generate control signals for driving the actuator members. In some instances, the control signals can be generated based on data received from carrier sensors indicative of the spatial disposition of the carrier or the payload 202 carried by the carrier 201. The carrier sensors may be situated on the carrier or the payload 202, as previously described herein. The control signals produced by the controllers can be received by the different actuator drivers. Based on the control signals, the different actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 201 can be coupled indirectly to the portable device via one or more damping elements. The damping elements can be configured to reduce or eliminate movement of the load (e.g., payload, carrier, or both) caused by the movement of the portable device. The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the portable device that are transmitted to the load.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements may provide damping primarily along the Y (yaw) axis. As such, the illustrated damping elements can be configured to reduce vertical motions.

Although various embodiments may be depicted as utilizing a single type of damping elements (e.g., rubber balls), it shall be understood that any suitable combination of types of damping elements can be used. For example, the carrier may be coupled to the portable device using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the portable device. In some instances, the load can be embedded within or enclosed by one or more damping elements.

Figure 3:
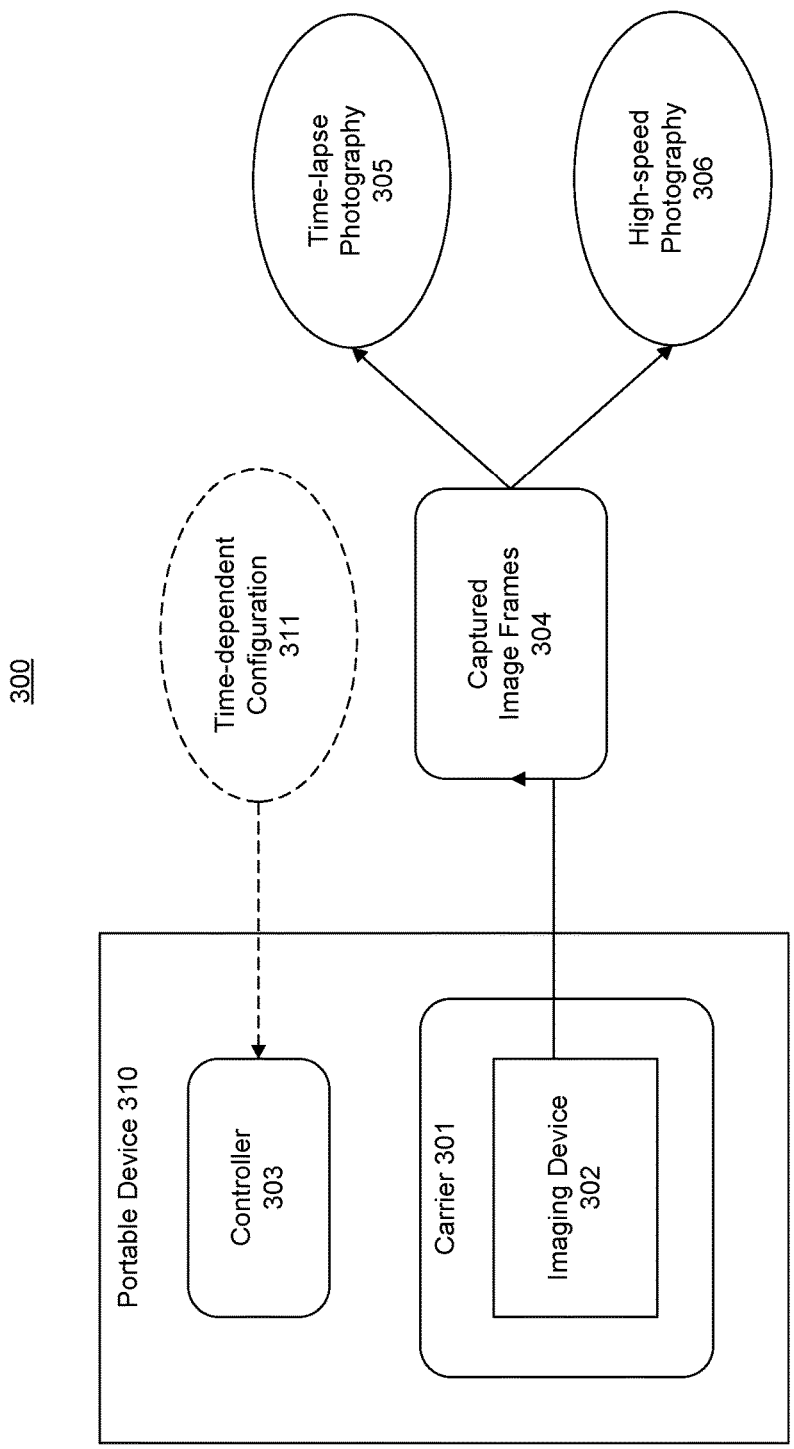
FIG. 3 is an exemplary illustration of configuring time-dependent photography in a portable device environment, in accordance with various embodiments of the present invention.

FIG. 3 is an exemplary illustration of configuring time-dependent photography in a portable device environment, in accordance with various embodiments of the present invention. As shown in FIG. 3, a portable device 310 can include a carrier 301, which carries an imaging device 302 in a portable device environment 300.

Furthermore, a controller 303 on the portable device 310 can direct the imaging device 302 to capture a set of image frames 304 with a time-dependent configuration 311. For example, the controller 303 may be collocated with the imaging device 302 on the carrier 301 (as part of the payload). Alternatively, the controller 303 may be positioned on the handler of the portable device 310.

In accordance with various embodiments of the present invention, the time-dependent configuration 311 can be defined based on different time-dependent configuration parameters. For example, a time-dependent configuration parameter can be the total shooting time. Additionally, the time-dependent configuration parameters can include the frequency, or frame rate, at which the image frames 304 are captured, and/or the time intervals for capturing the image frames 304.

Furthermore, in order to create various time-dependent photographical effects, the captured image frames 304 (or video) may be played at a different frequency from the frequency that the image frames 304 are captured. In other words, the frame displaying rate may be different from the frame capturing rate.

For example, the system can support the time-lapse photography 305 when the image frames 304 are captured at a frame rate that is slower than the frame displaying rate. The time-lapse photography 305 may effectively compress the captured image frames 304 (or video) along the time axis and creates an effect that appears to be speeding up a slow process. For example, the time-lapse photography 305 may show a slow progress over days or years in a fast-forward mode for a few minutes or hours. Thus, the time-lapse photography 305 can be beneficial in shooting the city scenes, natural landscape, astronomical phenomena, metropolitan life, building or manufacturing processes, biological evolution and other topics.

On the other hand, the system can support high-speed (or slow-motion) photography 306, when the image frames 304 are captured at a frame rate that is faster than the displaying frame rate. The high-speed photography 306 may effectively expand the captured image frames 304 (or video) along the time axis and creates an effect that appears to be slowing down a fast process. For example, the high-speed photography 306 may show a momentary process in a slow motion for several minutes. Thus, the high-speed photography 306 can be beneficial in capturing the exciting moments in athletic activities, natural phenomena and other topics.

Figure 4:
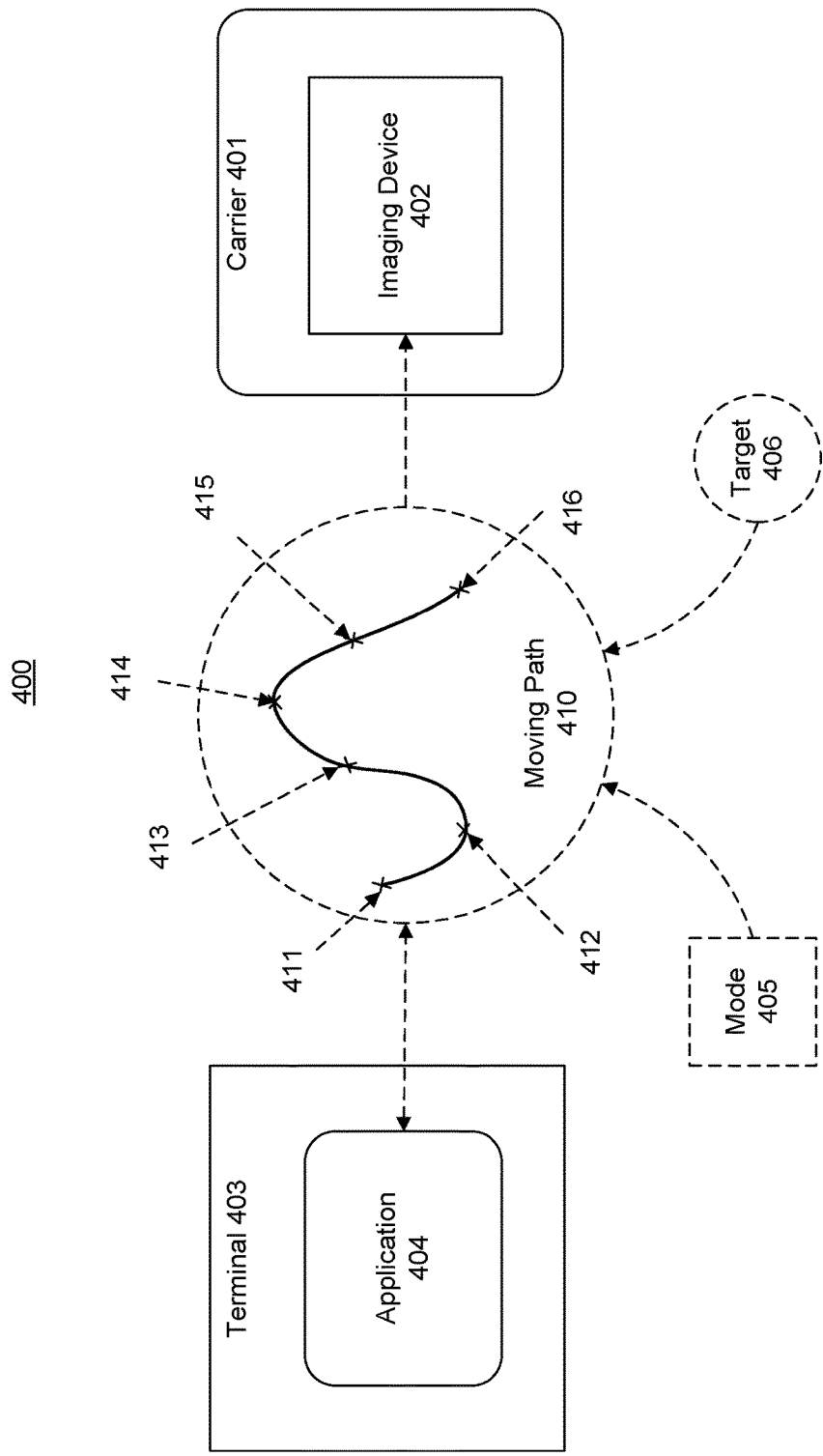
FIG. 4 is an exemplary illustration of configuring a moving path for an imaging device in a portable device environment, in accordance with various embodiments of the present invention.

FIG. 4 is an exemplary illustration of configuring a moving path for an imaging device in a portable device environment, in accordance with various embodiments of the present invention. As shown in FIG. 4, a carrier 401 can move the imaging device 402 along a moving path 410.

For example, the carrier 401 can take advantage of a portable three-axis gimbal, which may employ three motors that are distributed orthogonally in the space. These motors can control the respective pitch, roll, and yaw movement of the imaging device 402. Furthermore, the rotor for a first motor can be connected with the payload (e.g. the imaging device 402), while the stator for the first motor can be connected with the rotor for the second motor and the stator for the second motor can be connected with the rotor for the third motor. Additionally, the stator for the third motor can be connected with a handler or other portion of the portable device. Thus, the system can produce high resolution and high quality images with low cost, since the portable three-axis gimbal can rotate about one or more axes for stabilizing the imaging device 402.

In accordance with various embodiments of the present invention, the system can configure the moving path 410 for the imaging device 402 in different ways.

As shown in FIG. 4, the moving path 410 can be determined based on one or more preconfigured rotating modes 405. For example, a user can select from still, clockwise lateral, counterclockwise lateral, vertical top-down or bottom-up and/or other mobile paths. Then, the system can determine the rotating speed for the carrier 401 based on the rotational path (such as the total shooting angle) and/or the total shooting time as input by the user.

Additionally, the moving path 410 can be determined based on a designated target 406. The system can dynamically determine the moving path 410 by tracking down the designated target 406. Also, the system can capture images 304 while tracking the designated target 406.

Alternatively, the system allows a user to customize the moving path 410. For example, a user can configure the waypoints 411-416 for the imaging device 403. The waypoints 411-416 may include the starting point and can be configured with random pattern. Then, the system can automatically generate a moving path 410 for the imaging device 402 based on the waypoints 411-416.

In accordance with various embodiments of the present invention, the system can generate multiple path options based on the same waypoints 411-416, and the user is allowed to select a moving path 410 from the different path options. For example, when a user inputs three waypoints, the system can generate two path options such as a wave shape path and a triangular shape path. The system allows the user to select either the wave shape path or the triangular shape path for moving the imaging device 402. Also, the system allows a user to modify the moving path 410 when it is needed.

Furthermore, the system can determine the rotating speed of the carrier 401 based on the rotational path (such as the total shooting angle) and/or the total shooting time as input by the user. Also, the system can configure the carrier 401 to move the imaging device 403 at a speed that is adapted to the moving path 410. Also, the system can configure the carrier 401 to move the imaging device 403 at different speeds for different parts of the moving path 410.

In accordance with various embodiments of the present invention, the system can configure one or more shooting positions for the imaging device 402 along the moving path 410. For example, a user can configure the shooting positions via an application 404 on a terminal 403. Alternatively, a user can configure the shooting positions by manually operating the joysticks on a remote control or by directly configuring the imaging device 403 by hand.

Furthermore, in order to provide better user experience, the system can generate a preview for the imaging device 403 at each shooting position. Also, the system can display the preview for the imaging device 403 at multiple shooting positions along the moving path 410.

Additionally, using an application 404 on the terminal 403, a user can add a number of shooting positions for the imaging device 402. Also, the user can remove one or more shooting positions by deleting a preview for a shooting position. Moreover, the user can change the rotating speed of the carrier 401 for a particular segment of the moving path 410, by dragging a preview of a shooting position for the imaging device 403 on a display.

Thus, a user can configure a customized moving path 410 for the imaging device 402, without being limited to merely the horizontal or vertical direction.

Figure 5:
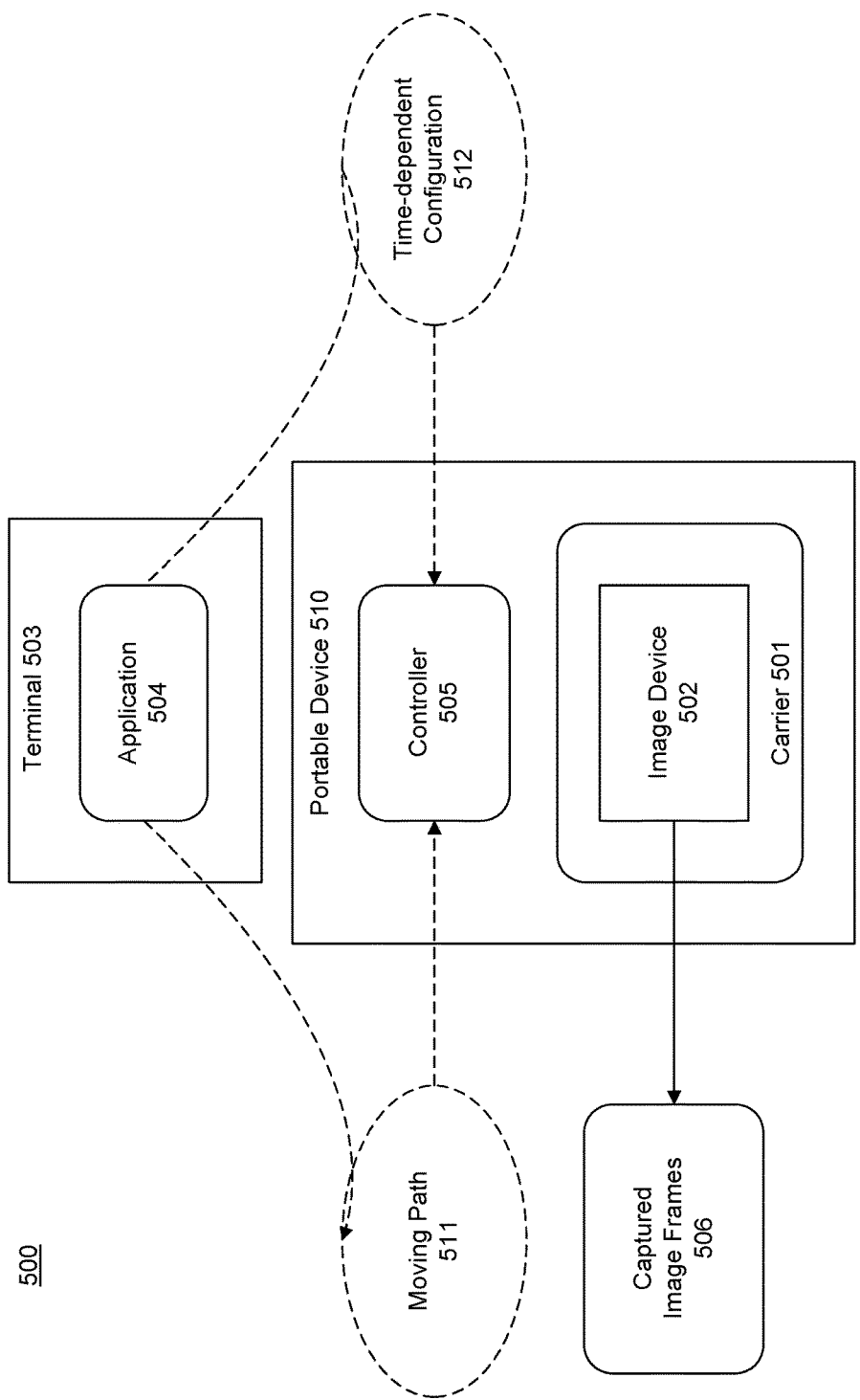
FIG. 5 is an exemplary illustration of supporting time-dependent photography in a portable device environment, in accordance with various embodiments of the present invention.

FIG. 5 is an exemplary illustration of supporting time-dependent photography in a portable device environment, in accordance with various embodiments of the present invention. As shown in FIG. 5, a portable device 510 can receive various configuration information from an application 504 on a terminal 503 for supporting time-dependent photography in a portable device environment 500. The application 504 can provide a user interface via a display on the terminal 503.

In accordance with various embodiments of the present invention, a controller 505 on the portable device 510 can receive the moving path 511 and time-dependent configuration 512 from the application 504. For example, the controller 505 may be collocated with the imaging device 502 on the carrier 501 (as part of the payload). Alternatively, the controller 505 may be positioned on the handler of the portable device 510.

Then, the controller 510 can configure a carrier 501 to move an imaging device 502 along a moving path 511. Furthermore, the controller 510 can apply a time-dependent configuration 512 on the imaging device 502, and use the imaging device 502 for capturing a set of image frames 506 along the moving path 511 based on the time-dependent configuration 512.

In accordance with various embodiments of the present invention, various sensors on the portable device 510 can be used for collecting the state information of the imaging device 502. The controller 505 can obtain the state information of the imaging device 502 on the portable device 510. For example, the state information may include positional information, such as the location, speed, and acceleration of the portable device 510. Additionally, the controller 505 can obtain the attitude information for the imaging device 502 based on the attitude information received from the imaging device 502 on the portable device 510.

Thus, the system can take advantage of the state information of the imaging device 502 for supporting time-dependent photography. For example, the system can configure and ensure the shooting positions for the imaging device 502 based on the obtained state information of the imaging device 502.

Figure 6:
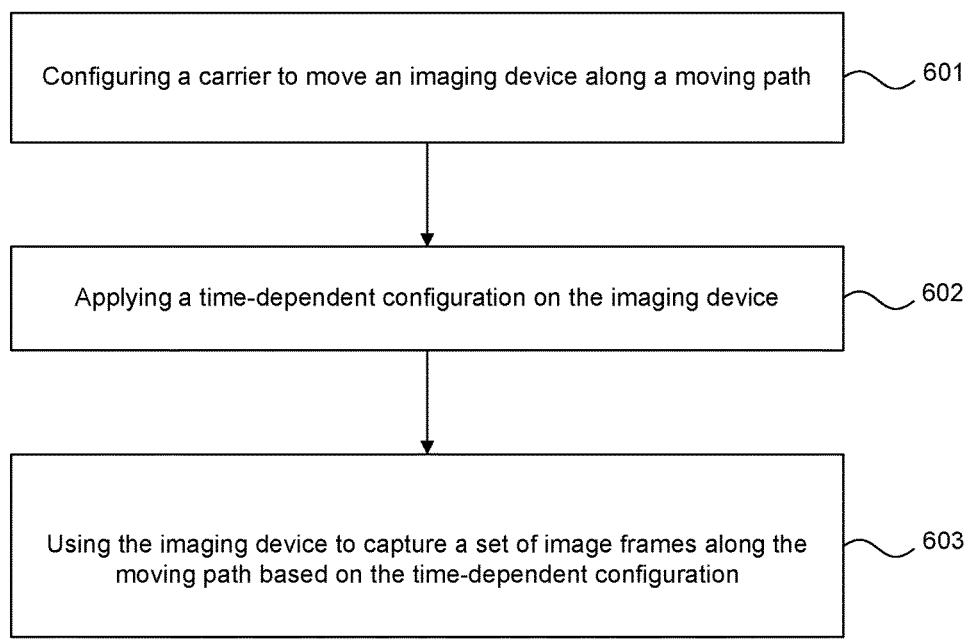
FIG. 6 shows a flowchart of supporting time-dependent photography in a portable device environment, in accordance with various embodiments of the present invention.
Figure 7:
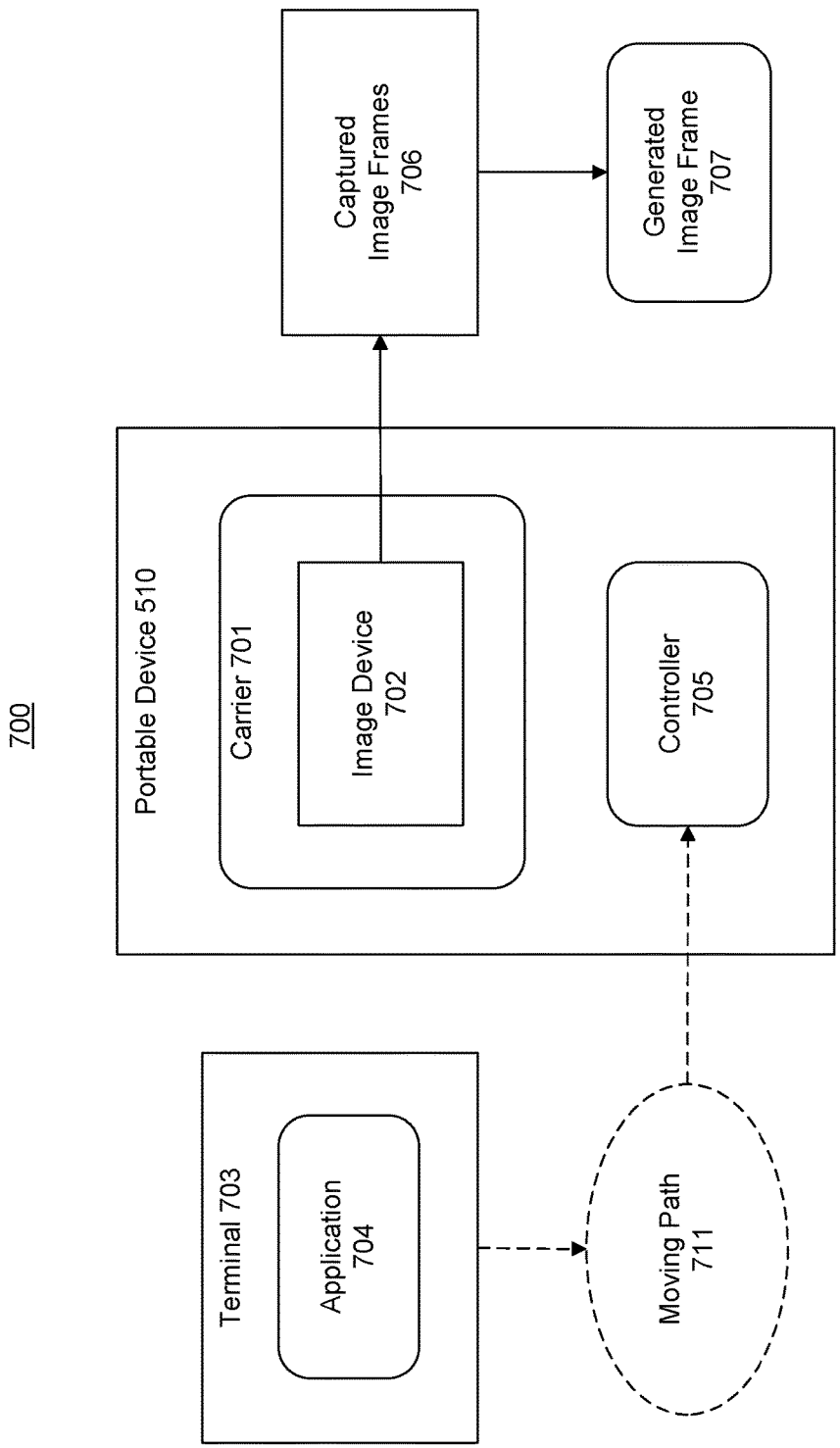
FIG. 7 is an exemplary illustration of supporting panoramic photography in a portable device environment, in accordance with various embodiments of the present invention.

FIG. 6 shows a flowchart of supporting time-dependent photography in a portable device environment, in accordance with various embodiments of the present invention. As shown in FIG. 6, at step 601, a controller on a portable device can configure a carrier to move an imaging device along a moving path. Then, at step 602, the controller can apply a time-dependent configuration on the imaging device. Furthermore, at step 603, the controller can use the imaging device to capture a set of image frames along the moving path based on the time-dependent configuration FIG. 7 is an exemplary illustration of supporting panoramic photography in a portable device environment, in accordance with various embodiments of the present invention. As shown in FIG. 7, a portable device 710 can use a carrier 701 to stabilize an imaging device 702 for supporting panoramic photography.

For example, the carrier 701 can take advantage of a portable three-axis gimbal, which may employ three motors that are distributed orthogonally in the space. These motors can control the respective pitch, roll, and yaw movement of the imaging device 702. Furthermore, the rotor for a first motor can be connected with the payload (e.g. the imaging device 702), while the stator for the first motor can be connected with the rotor for the second motor and the stator for the second motor can be connected with the rotor for the third motor. Additionally, the stator for the third motor can be connected with a handler for the portable device.

As shown in FIG. 7, a controller 705 in the portable device 710 can receive various configuration information from an application 704 on a terminal 703 in a portable device environment 700. For example, the controller 705 may be collocated with the imaging device 702 on the carrier 701 (as part of the payload). Alternatively, the controller 705 may be positioned on the handler of the portable device 710.

Also, the application 704 can provide a user interface via a display on the terminal 703

In accordance with various embodiments of the present invention, the imaging device 702 can be configured to move along a moving path 711. For example, the moving path 711 can be a circle or a part of or a circle. Alternatively, the imaging device 702 can be configured to move along a customized moving path 711 that passes various waypoints (as shown in FIG. 4). Then, the system can use the imaging device 702 to capture a set of image frames 706 along the moving path 711.

Furthermore, the system can configure the carrier 701 to move the imaging device 702 within different sections of the moving path 711. For example, the moving path 711 can be defined with multiple sections, with each section covers a thirty degree angle. Additionally, the controller 710 can direct the carrier 701 to move the imaging device 702 into a different section of the moving path 711, after receiving an instruction from the user.

In accordance with various embodiments of the present invention, the system can generate one or more images 707 based on the captured image frames 705. A generated image 707 can be a panoramic image with an elongated field of view (FOV). For example, the panoramic image can provide a FOV that is approximately, or greater than, the FOV of the human eye.

Furthermore, the generated image 707 may be in the form of a wide strip. For example, the generated image 707 may have an aspect ratio of 2:1 or larger, i.e. the width of the generated image 707 can be at least twice as the height. Also, some panoramic images may have substantial large aspect ratios, such as 4:1 or even 10:1, capable of covering a FOV up to 360 degrees (i.e. providing a surrounding view).

In accordance with various embodiments of the present invention, the system can use different stitching methods for generating a panoramic image 707 based on the set of image frames 706. Here, in order for supporting the stitching methods, a portion of each image frame in the set of captured image frames 706 may overlap with a portion of at least one other image frame in the set of image frames 706. For example, the system can set a minimum overlapping portion (e.g. 15%) for each image frame in the set of captured image frames 706.

Additionally, the system can take advantage of the state information of the imaging device 702. The state information of the imaging device 702, which are collected by various sensors on the portable device 710.

In accordance with various embodiments of the present invention, the controller 705 can obtain the state information of the imaging device 702 on the portable device 710. For example, the state information may include positional information, such as the location, speed, and acceleration of the portable device 710. Additionally, the controller 705 can obtain the attitude information for the imaging device 702 based on the attitude information received from the imaging device 702 on the portable device 710.

Thus, the system can determine the corresponding relationship among the pixels in the overlapping images 706, based on the measured relative movement of the FOV of the imaging device 702. As a result, the system can reduce the complexity and computing cost for stitching the set of captured image frames 706 together to generate the panoramic image 707.

In accordance with various embodiments of the present invention, the system can provide different modes for supporting the panoramic photography, after connecting the portable device 710 with the terminal 703 (e.g. a smart phone).

For example, using an automatic mode, the user can direct the portable device 710 to automatically move the imaging device 702 to the starting position and to proceed with the shooting or recording process, by pressing a "record" button either on the portable device 710 or in a displayed user interface. Also, a user may interrupt the shooting or recording process at any time during the process. Additionally, the system may automatically perform the stitching steps for generating a panoramic picture, as soon as the shooting or recording process is completed.

On the other hand, using a semi-automatic or manual mode, the shooting or recording process along the moving path 711 can be divided into multiple sections. A user can start the shooting or recording process by pressing a button either on the portable device 710 or in a displayed user interface. After finishing the shooting or recording process for a particular section of the moving path 711, the system can instruct the imaging device 702 to stop moving and wait for instruction. Afterwards, the user can resume the shooting or recording process by pressing the record button again, which may cause the imaging device 702 to move to the next section of the moving path 711.

Thus, the panoramic photography can be beneficial in capturing the city scenes, natural landscape, astronomical phenomena, metropolitan life, athletic activities and other topics, since the panoramic photography can provide an expanded field of view (FOV) as desired by the users. For example, the panoramic photography can be used for generating a dome view or a surrounding view from a particular location for displaying a scene or an activity. Also, the panoramic photography can be used for showing social life, such as taking a picture for an event with a large setting, or performing a self-portrait of a group of people in action (e.g. within an expanded FOV)

Figure 8:
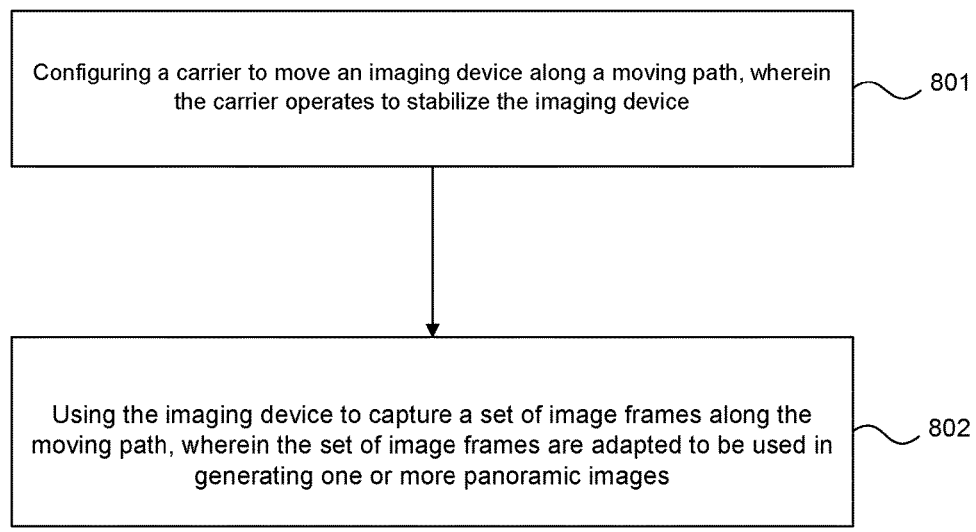
FIG. 8 shows a flowchart of supporting panoramic photography in a portable device environment, in accordance with various embodiments of the present invention.

FIG. 8 shows a flowchart of supporting panoramic photography in a portable device environment, in accordance with various embodiments of the present invention. As shown in FIG. 8, at step 801, a controller can configure a carrier to move an imaging device along a moving path, wherein the carrier operates to stabilize the imaging device. Furthermore, at step 802, the controller can use the imaging device to capture a set of image frames along the moving path, wherein the set of image frames are adapted to be used in generating one or more panoramic images.

Figure 9:
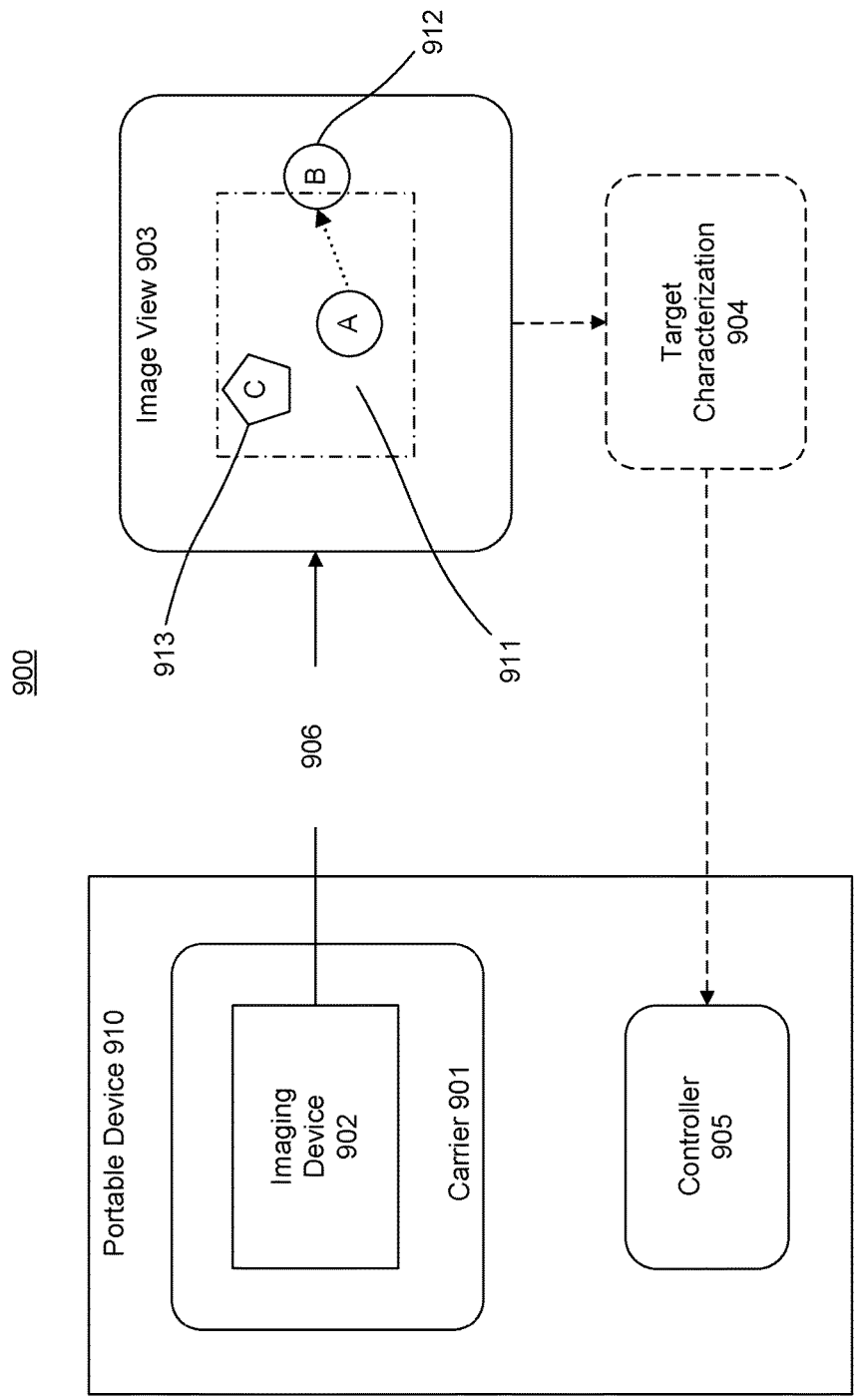
FIG. 9 is an exemplary illustration of tracking a moving object in a portable device environment, in accordance with various embodiments of the present invention.

FIG. 9 is an exemplary illustration of tracking a moving object in a portable device environment, in accordance with various embodiments of the present invention. As shown in FIG. 9, a portable device 910 can use a carrier 901 to stabilize an imaging device 902.

For example, the carrier 901 can take advantage of a portable three-axis gimbal, which may employ three motors that are distributed orthogonally in the space. These motors can control the respective pitch, roll, and yaw movement of the imaging device 902. Furthermore, the rotor for a first motor can be connected with the payload (e.g. the imaging device 902), while the stator for the first motor can be connected with the rotor for the second motor and the stator for the second motor can be connected with the rotor for the third motor. Additionally, the stator for the third motor can be connected with a handler for the portable device.

In accordance with various embodiments of the present invention, an image view 903 can be used for providing real-time imagery information 906 to a user. For example, the image view 903 can be displayed on a user terminal, such as a tablet or a smart phone, which is connected with the portable device 910 via a wired and/or wireless communication protocol.

As shown in FIG. 9, the portable device 910 can acquire a target 912 in an image view 903 based on the real-time imagery information 906 (i.e. image frames) that are captured by the imaging device 902. For example, a user is allowed to identify or designate the target 912 as appeared in the image view 903. Then, the user terminal can transmit the location information of the target 912 in the image view 903 to a controller 905 on the portable device 910. For example, the controller 905 may be collocated with the imaging device 902 on the carrier 901 (as part of the payload). Alternatively, the controller 905 may be positioned on the handler of the portable device 910.

After receiving the location information of the target 912 in the image view 903, a controller 905 in the portable device 901 can obtain characterization information 904 of the target 912 in the image view 903. For example, the characterization information of the target 912 in the image view 903 can be obtained by evaluating the image frames that are captured by the imaging device 902. Then, as the target 912 moves (e.g. from a location A to a location B), the controller 905 can track the target 912 based on the obtained characterization information of the target.

In accordance with various embodiments of the present invention, the system can use various object tracking methods for tracking the target 912 in the image view 903. For example, these object tracking methods can be based on various target representation schemes (such as the holistic templates) and different search mechanisms (e.g. the particle filters). Also, the object tracking methods can employ a model update module to handle the target appearance variations. Additionally, some object tracking methods can take advantage of the context information and combined trackers.

Furthermore, the portable device 910 allows a user to shoot one or more pictures of the target 912 and/or record a video of the target 912 while tracking the target 912. The system can assist a user in the shooting or recording process by tracking the designated target 912 automatically in the image view 903. There is no need for the user to manually move the imaging device 902 to follow the target, which is inconvenient and cumbersome.

In accordance with various embodiments of the present invention, the system can direct the carrier 901 to move the imaging device 902 for maintaining the target 912 within a tracking area 911 in the image view 903. The tracking area 911 can be a preconfigured area in the image view 903, or may be defined dynamically in-the-flight. For example, the tracking area 911 can be a center area in the image view 903, which may be preconfigured in different geometric shapes. Alternatively, the tracking area 911 can be a specified area in the image view 903, which is off-center and may be close to an edge.

Then, the controller 905 can send one or more control signals to the carrier for maintaining the target 912 within the tracking area 911 as the target 912 moves. For example, the controller 905 can direct the carrier to rotate about different axes in responding to the movement of the target 912 in the image view 903.

As shown in FIG. 9, the system can maintain the target 912 within a tracking area 911 in the image view 903 based on the images captured by the imaging device 902 on the portable device 910. The tracking area 911, which locates at the center of the image view 903, can be configured in a rectangular shape with an up boundary, a down boundary, a left boundary and a right boundary.

In accordance with various embodiments of the present invention, the controller 905 can direct the carrier 901 to rotate about a yaw axis when the target 912 crosses the left or right boundary of the center area 911, and direct the carrier to rotate about a pitch axis when the target 912 crosses the up or down boundary of the center area 911.

Additionally, the controller 905 can receive one or more signals to switch to a new target 913 at a location C. Accordingly, the controller 905 can direct the carrier 901 to move the imaging device 902 to track the new target 913 based on the obtained characterization information of the new target 913 as the new target 913 moves.

Thus, the system can alleviate the burden on a user for following a moving object while shooting and/or recording, by automatically adjusting the attitude of the imaging device 902 on the carrier 901.

Figure 10:
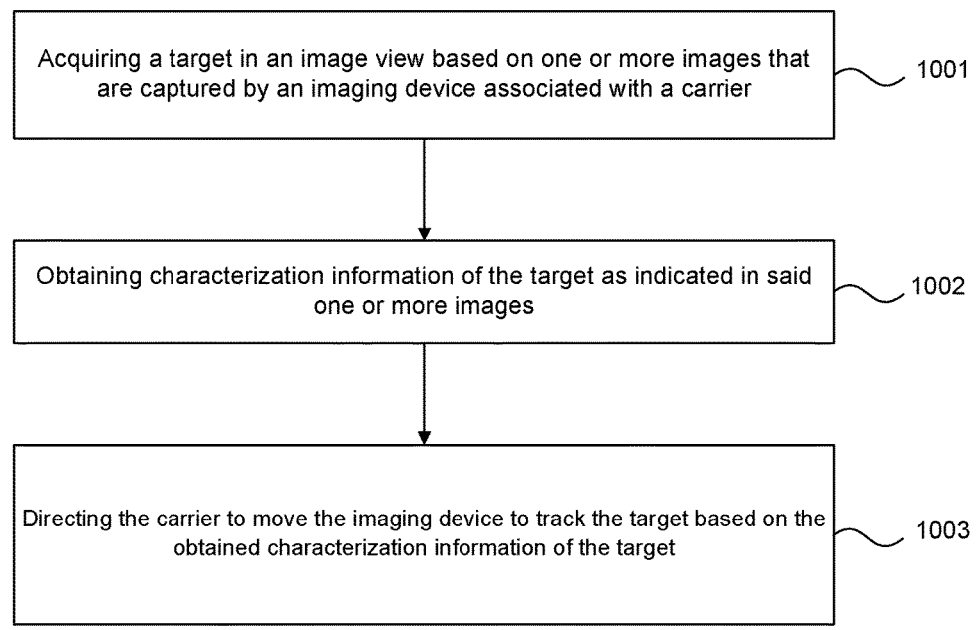
FIG. 10 shows a flowchart of tracking a moving object in a portable device environment, in accordance with various embodiments of the present invention.

FIG. 10 shows a flowchart of tracking a moving object in a portable device environment, in accordance with various embodiments of the present invention. As shown in FIG. 10, at step 1001, a controller can acquire a target in an image view based on one or more images that are captured by an imaging device associated with a carrier. Then, at step 1002, the controller can obtain characterization information of the target as indicated in said one or more images. Furthermore, at step 1003, the controller can direct the carrier to move the imaging device to track the target based on the obtained characterization information of the target Many features of the present invention can be performed in, using, or with the assistance of hardware, software, firmware, or combinations thereof. Consequently, features of the present invention may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting photography, comprising:
    acquiring a target in an image view based on one or more images that are captured by an imaging device associated with a carrier;
    obtaining characterization information of the target as indicated in said one or more images;
    determining a moving path having at least two sections for tracking the target with the imaging device;

determining a corresponding speed for each section of the moving path;

directing the carrier to move the imaging device, at the corresponding speeds, along each of the at least two sections of the moving path to track the target based on the obtained characterization information of the target; and capturing one or more images using the imaging device along the moving path based on a time-dependent configuration of the imaging device.

2. The method of claim 1, further comprising:
receiving, from an application, one or more signals to configure the imaging device and the carrier, wherein the application provides a user interface via a display on a terminal.

3. The method of claim 1, further comprising:
displaying the image view on a terminal that operates to receive one or more signals from the imaging device.

4. The method of claim 3, wherein:
said one or more signals contains real-time images that are captured by the imaging device.

5. The method of claim 3, further comprising:
allowing a user to designate the target in the image view that is displayed on the terminal.

6. The method of claim 5, further comprising:
receiving information that is indicative of a position of the target in the image view based on said one or more images.

7. The method of claim 1, further comprising:
determining a position of the target in the image view as the target moves, and
detecting whether the target is outside a designated area in the image view.

8. The method of claim 7, wherein:
the designated area in the image view is configurable.

9. The method of claim 8, wherein:
the designated area in the image view is in a rectangular shape with an up boundary, a down boundary, a left boundary and a right boundary.

10. The method of claim 7, wherein:
the carrier includes a gimbal that operates to rotate about one or more axes to maintain the target within the designated area in the image view.

11. The method of claim 10, further comprising:
directing the carrier to rotate about a yaw axis when the target moves outside a left or a right boundary of the designated area; and
directing the carrier to rotate about a pitch axis when the target moves outside an up or a down boundary of the designated area.

12. The method of claim 1, further comprising:
receiving one or more signals to switch target.

13. The method of claim 12, further comprising:
directing the carrier to move the imaging device tracking another target based on obtained characterization information of the another target.

14. The method of claim 1, further comprising:
capturing one or more images and/or recording a video of the target while tracking the target.

15. The method of claim 1, wherein the carrier includes a gimbal that operates to rotate the imaging device around one or more axes, the rotating causing the imaging device to move along the at least two sections of the moving path at the corresponding speeds.

16. The method of claim 1, wherein the carrier couples the imaging device to a portable device.

17. The method of claim 16, wherein the portable device includes one or more mechanisms for moving a gimbal along the at least two sections of the moving path at the corresponding speeds.

18. A system for supporting photography, comprising:
one or more microprocessors; and
a controller running on the one or more microprocessors, wherein the controller operates to:
acquire a target in an image view based on one or more images that are captured by an imaging device associated with a carrier;
obtain characterization information of the target as indicated in said one or more images;
determine a moving path having at least two sections for tracking the target with the imaging device;
determine a corresponding speed for each section of the moving path;
direct the carrier to move the imaging device, at the corresponding speeds, along each of the at least two sections of the moving path to track the target based on the obtained characterization information of the target; and
capture one or more images using the imaging device along the moving path based on a time-dependent configuration of the imaging device.

19. The system of claim 18, wherein:
the controller operates to receive, from an application, one or more signals to configure the imaging device and the carrier, wherein the application provides a user interface via a display on a terminal.

20. The system of claim 18, wherein:
the controller operates to display the image view on a terminal that operates to receive one or more signals from the imaging device.

21. The system of claim 20, wherein:
said one or more signals contains real-time images that are captured by the imaging device.

22. The system of claim 20, wherein:
a user is allowed to designate the target in the image view that is displayed on the terminal.

23. The system of claim 22, further comprising:
the controller operates to receive information that is indicative of a position of the target in the image view based on said one or more images.

24. The system of claim 18, wherein:
the controller operates to
determine a position of the target in the image view as the target moves, and
detect whether the target is outside a designated area in the image view.

25. The system of claim 24, wherein:
the designated area in the image view is configurable.

26. The system of claim 25, wherein:
the designated area in the image view is in a rectangular shape with an up boundary, a down boundary, a left boundary and a right boundary.

27. The system of claim 24, wherein:
the carrier includes a gimbal that operates to rotate about one or more axes to maintain the target within the designated area in the image view.

28. The system of claim 27, wherein:
the controller operates to
direct the carrier to rotate about a yaw axis when the target moves outside a left or a right boundary of the designated area; and direct the carrier to rotate about a pitch axis when the target moves outside an up or a down boundary of the designated area.

29. The system of claim 18, wherein:
the controller operates to receive one or more signals to switch to another target.

30. The system of claim 29, wherein:
the controller operates to direct the carrier to move the imaging device tracking said another target based on obtained characterization information of said another target.

31. The system of claim 18, wherein:
the controller operates to capture one or more images and/or recording a video of the target while tracking the target.

32. The system of claim 18, wherein the carrier includes a gimbal that operates to rotate the imaging device around one or more axes, the rotating causing the imaging device to move along the at least two sections of the moving path at the corresponding speeds.

33. The system of claim 18, wherein the carrier couples the imaging device to a portable device.

34. The system of claim 33, wherein the portable device includes one or more mechanisms for moving a gimbal along the at least two sections of the moving path at the corresponding speeds.

35. A non-transitory computer-readable medium with instructions stored thereon, that when executed by a processor, perform the steps comprising:
acquiring a target in an image view based on one or more images that are captured by an imaging device associated with a carrier;
obtaining characterization information of the target as indicated in said one or more images;
determining a moving path having at least two sections for tracking the target with the imaging device;
determining a corresponding speed for each section of the moving path;
directing the carrier to move the imaging device, at the corresponding speeds, along each of the at least two sections of the moving path to track the target based on the obtained characterization information of the target; and
capturing one or more images using the imaging device along the moving path based on a time-dependent configuration of the imaging device.

36. A system for supporting photography, comprising:
an imaging device, which is associated with an carrier; and
a control device, wherein the control device operates to:
acquire a target in an image view based on one or more images that are captured by an imaging device associated with a carrier;
obtain characterization information of the target as indicated in said one or more images;
determine a moving path having at least two sections for tracking the target with the imaging device;
determine a corresponding speed for each section of the moving path;
direct the carrier to move the imaging device, at the corresponding speeds, along each of the at least two sections of the moving path to track the target based on the obtained characterization information of the target; and
capture one or more images using the imaging device along the moving path based on a time-dependent configuration of the imaging device.

* * * * *